UNITED STATES PATENT OFFICE.

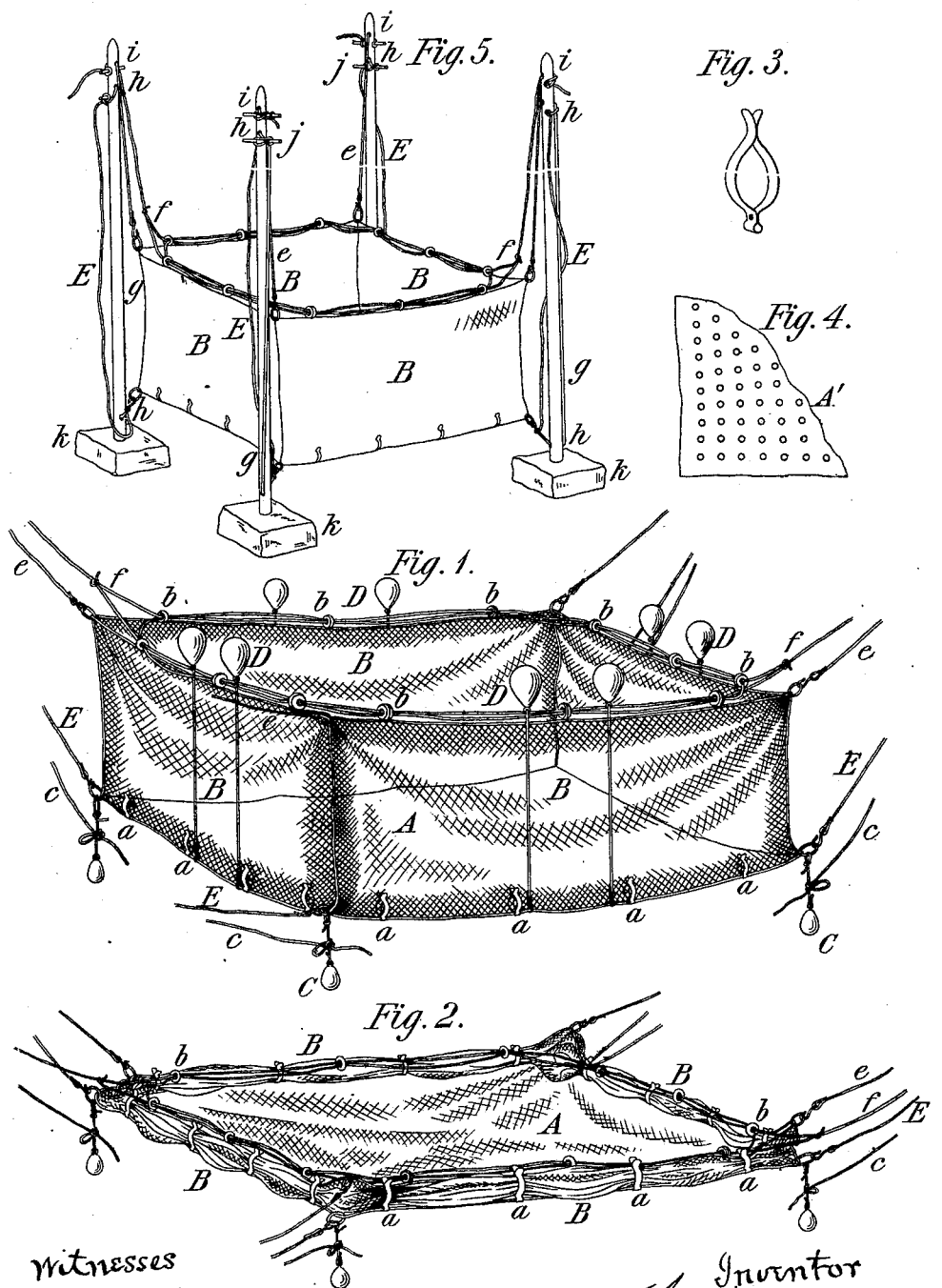

LORING BATES, OF COHASSET, MASSACHUSETTS.

IMPROVEMENT IN SEINES FOR FISHING.

Specification forming part of Letters Patent No. 197,313, dated November 20, 1877; application filed April 7, 1877.

*To all whom it may concern:*

Be it known that I, LORING BATES, of Cohasset, in the county of Norfolk and State of Massachusetts, have invented a new and useful Improvement in Seines or Fishing-Nets, which improvement is fully set forth in the following specification, reference being had to the accompanying drawings.

My invention relates both to the construction and operation of fish-nets; is applicable to deep-sea or shoal water; combines simplicity and economy in construction, and efficiency in operation; and consists of a net made with a bottom and sides, operated by sinking below the surface of the water, with the sides folded down as flush with the bottom as is possible, and further operated by quickly raising the said sides and pursing in the top.

My invention further consists in the use of devices for temporarily retaining the sides of the net when the same are folded down.

My invention further consists in the use of floats around the top of the net, supplementary floats secured by long lines to the bottom of the net, detachable weights on the lower corners, double pursing-lines reeving through the floats attached to the top of the net, and lines attached to lower and upper corners for manipulating the net.

My invention further consists in the use of a canvas or cloth bottom having eyelet-holes in localities where a twine bottom would be inoperative.

My invention further consists in the use, in combination, of stakes in local fishing.

Referring to the drawings, Figure 1 is a perspective view of my invention, showing sides raised; Fig. 2, the same, with sides down and secured in the devices for that purpose; Fig. 3, enlarged representation of said device; Fig. 4, section of the canvas or cloth bottom. Fig. 5 shows connection with stakes.

In the several figures the same parts will be found designated by the same letters.

A is the bottom, B B are the sides, of the net, all made of twine, and in manner as in ordinary seines, except when designed for use on the sea bottom or over ledges where twine would catch and tear. In that case the cloth bottom, Fig. 4, is substituted.

$a\,a$ represent the clasps for holding the sides. They are secured around the bottom line of the net, so that part of each clasp shall be in, and part outside of, the net. They should be made of metal or other durable material, have sufficient tension to retain the sides down against the buoyancy of the floats $b\,b$, and yet allow the said sides to be readily freed and raised by hauling on the lines $e\,e$, secured to the upper corners of the net for that purpose.

It is my aim to do away with all weights and floats as used in the construction of ordinary seines, in which the weights are placed at intervals along the bottom line, and floats or buoys, sufficient to float the seine and its weights, secured around the surface line.

In my invention I depend upon the boats (or stakes when used) to maintain the net in the desired position, by means of the lines E E, secured to the lower corners, using the supplementary floats D D, when required, for the specific purpose of preventing the net sagging between the corners. These floats are attached to the bottom line of the net by lines long enough to allow the float to remain on the surface of the water when the bottom of the net is at the required depth. They should be secured centrally between the corners.

The floats $b\,b$ serve to maintain the sides, when raised, in an upright position, and are secured directly to the top line of the net. They also serve to carry the pursing-lines $f\,f$, and are made annular or perforated for that specific purpose. All the floats $b\,b$ and D D combined should not have sufficient buoyancy to keep the net from sinking when the corners are unsupported.

The detachable weights C C are attached to loops on the lower corners of the net by a slip-knot manipulated by the lines $c\,c$. These serve to prevent the bottom of the net from rising when the lines $e\,e$ are hauled to raise the sides.

$g\,g$ represent the stakes used in local or shoal-water fishing. $h\,h$ are the holes through which reeve the lines E E, made endless in this case for raising the bottom up or hauling it down; $i\,i$, holes for reeving the lines $e\,e$; J J, cleats to secure the lines; $k\,k$, stones which receive and support the stakes when the bottom is rocky.

With the foregoing description of the several parts and of the construction of my improvement, the following will answer to enable those skilled in the art to operate my invention.

When used for deep-sea fishing, the sides are to be gathered into a close compact fold, with the top line uppermost, and pressed into the clasps *a a*, the detachable weights C C and the floats D D added, and the working lines cleared. The net is then stretched out square ahead of the shoal of fish, by means of boats at each corner, and sunk to the proper depth, indicated by the position of the floats D D. If the fish change their course, the net is to be drawn under the water to suit the direction of the shoal. When the fish are over the net, the sides are to be quickly raised by hauling smartly on the lines *e e*. The net is then pursed up, and the fish taken out as in ordinary seining.

For ground-fishing, I use the cloth bottom, as described, allow the net to sink to the bottom, bait it, and, after waiting a proper time for the fish to congregate, free the sides from the clasps, and purse the net while still on the bottom. In this case the floats D D are dispensed with.

Where fish naturally shoal or congregate over or near sunken ledges, I set the net in connection with the stakes G G, reeving the several lines through the holes described, and set the net as near the bottom as desired, and operate as before. The cloth bottom may also be used in this connection. The detachable weights and also the floats D D are dispensed with.

The method of operating can be readily modified to adapt it to other kinds of fishing; and it may not be always desired to set the net with all the sides down.

Having fully described the construction and operation of my improvement, what I claim as new, and desire to secure by Letters Patent, is—

1. The combination, with a net or seine having a bottom and surrounding sides, of the clasps *a a*, or their equivalent, for the purpose described.

2. In a net made with a bottom and surrounding sides, provided with devices for temporarily securing the sides down, the floats *b b* and D D, detachable weights C C, working-lines E E and *e e*, and double pursing-lines *f f*, reeving through the floats *b b*, as and for the purpose described.

3. In a net made with a bottom and surrounding sides, and provided with devices for temporarily securing the sides down, the perforated canvas or cloth bottom, as and for the purpose described.

4. The combination of the stakes G G, receiving and supporting stones *k k*, or their equivalent, and the endless line E E, with a net made with a bottom and surrounding sides, and provided with devices for temporarily retaining the sides down, all substantially as and for the purpose described.

5. The improved method of operating seines or fishing-nets having a bottom and surrounding sides, by first sinking below the surface of the water, with all or part of the said sides gathered, folded, and temporarily secured down as flush with the bottom edge or edges as practicable, and afterward raising the said sides to their normal position while still under the water, substantially as described, and for the purposes set forth.

In testimony whereof I have signed my name in the presence of two subscribing witnesses.

LORING BATES.

Witnesses:
CLEMENT B. TOWER,
THOMAS W. FOX.